United States Patent
Warren et al.

(10) Patent No.: US 9,627,003 B2
(45) Date of Patent: Apr. 18, 2017

(54) EXPLOSION PROOF UNDERGROUND MINING RECORDING SYSTEM AND METHOD OF USING SAME

(71) Applicant: TRINITY SOLUTIONS LLC, Mount Nebo, WV (US)

(72) Inventors: William J. Warren, Mount Nebo, WV (US); William C. Cook, II, Mount Nebo, WV (US); Christopher S. Skaggs, Mount Nebo, WV (US); Michael C. Pritt, Mount Nebo, WV (US)

(73) Assignee: TRINITY SOLUTIONS LLC, Mount Nebo, WV (US)

( * ) Notice: Subject to any disclaimer, the term of this patent is extended or adjusted under 35 U.S.C. 154(b) by 143 days.

(21) Appl. No.: 14/715,294

(22) Filed: May 18, 2015

(65) Prior Publication Data

US 2015/0334341 A1  Nov. 19, 2015

Related U.S. Application Data

(60) Provisional application No. 62/000,505, filed on May 19, 2014.

(51) Int. Cl.

| H04N 5/77 | (2006.01) |
|---|---|
| G11B 27/10 | (2006.01) |
| G11B 27/34 | (2006.01) |
| G11B 33/14 | (2006.01) |
| H04N 7/18 | (2006.01) |
| H04N 5/225 | (2006.01) |

(Continued)

(52) U.S. Cl.
CPC ............ *G11B 27/10* (2013.01); *G11B 27/105* (2013.01); *G11B 27/28* (2013.01); *G11B 27/34* (2013.01); *G11B 33/14* (2013.01); *H04N 5/2252* (2013.01); *H04N 5/765* (2013.01); *H04N 5/77* (2013.01); *H04N 7/183* (2013.01)

(58) Field of Classification Search
CPC .......... H04N 5/77; H04N 5/765; H04N 5/183; H04N 5/2252; G11B 27/28; G11B 27/34; G11B 27/105; G11B 27/14
See application file for complete search history.

(56) References Cited

U.S. PATENT DOCUMENTS

| 5,349,644 A | 9/1994 | Massey et al. |
| 5,967,616 A | 10/1999 | Offutt et al. |
| 6,040,759 A | 3/2000 | Sanderson |

(Continued)

FOREIGN PATENT DOCUMENTS

| EP | 1021867 B1 | 4/2002 |
| RO | 120998 B1 | 10/2006 |
| WO | 2012009754 A1 | 1/2012 |

OTHER PUBLICATIONS

Romano Napolitano, "Keynote III. Communications over HV-MV-LV Power Lines: Europe Standards and Regulations overview," p. 33, date unknown.

(Continued)

*Primary Examiner* — Huy T Nguyen
(74) *Attorney, Agent, or Firm* — Kenealy Vaidya LLP

(57) ABSTRACT

Methods, systems, and apparatuses are disclosed for an explosion proof recording system for recording an underground mining environment and other hazardous, low or restricted visibility environments.

20 Claims, 3 Drawing Sheets

(51) Int. Cl.
*G11B 27/28* (2006.01)
*H04N 5/765* (2006.01)

(56) References Cited

U.S. PATENT DOCUMENTS

| | | | |
|---|---|---|---|
| 6,522,626 | B1 | 2/2003 | Greenwood |
| 6,927,672 | B2 | 8/2005 | Zalitzky et al. |
| 6,995,657 | B2 | 2/2006 | Zalitzky et al. |
| 7,079,012 | B2 | 7/2006 | Wetmore |
| 7,406,536 | B2 | 7/2008 | Efrati et al. |
| 7,518,487 | B2 | 4/2009 | Zalitzky et al. |
| 7,667,344 | B2 | 2/2010 | Zitting et al. |
| 7,738,612 | B2 | 6/2010 | Rafaeli |
| 7,873,129 | B2 | 1/2011 | Goldfisher et al. |
| 7,937,065 | B2 | 5/2011 | Refaeli et al. |
| 8,149,106 | B2 | 4/2012 | Refaeli et al. |
| 2004/0264501 | A1 | 12/2004 | Zalitzky et al. |
| 2006/0079198 | A1 | 4/2006 | Sanderson |
| 2008/0063093 | A1 | 3/2008 | Refaeli et al. |
| 2008/0205417 | A1* | 8/2008 | Li ................ H04L 12/66 370/401 |
| 2009/0128347 | A1 | 5/2009 | Bucella et al. |
| 2009/0140852 | A1 | 6/2009 | Stolarczyk et al. |
| 2010/0020784 | A1 | 1/2010 | Goldfisher et al. |
| 2010/0073149 | A1 | 3/2010 | Goldfisher et al. |
| 2010/0073192 | A1 | 3/2010 | Goldfisher et al. |
| 2010/0076612 | A1 | 3/2010 | Robertson |
| 2010/0150172 | A1 | 6/2010 | Zalitzky et al. |
| 2010/0195744 | A1 | 8/2010 | Schwager et al. |
| 2010/0256862 | A1 | 10/2010 | Verhardt |
| 2010/0271044 | A1 | 10/2010 | Keret |
| 2012/0293653 | A1* | 11/2012 | Schweikart ........ E21C 41/00 348/143 |

OTHER PUBLICATIONS

Daniel Fink and Rho Jae Jeung, PhD, "Feasible connectivity solutions of PLC for rural and remote areas," 978-1-4244-1976-0/08, Copyright 2008, pp. 158-163, IEEE.

Written Opinion and International Search Report for PCT/US2013/071045, Apr. 14, 2014, 18 pages.

International Preliminary Examination Report for PCT/US2013/071045, May 26, 2015.

InfoTronixDesign, "Communications Products," dated Aug. 5, 2004, accessed via Wayback Machine on Nov. 14, 2013, <URL: http://web.archive.org/web/20040805173210/http:/www.infotronix.com.au/>.

* cited by examiner

EXPLOSION PROOF UNDERGROUND MINING RECORDING SYSTEM AND METHOD OF USING SAME

The present application is a non-provisional application and claims priority under 35 U.S.C. 119 to provisional application No. 62/000,505 filed on May 19, 2014, the entirety of which is hereby incorporated by reference.

TECHNICAL FIELD

The present application generally relates to devices, systems, and methods for improving visibility, safety, and accountability for underground mining environments and/or other low or restricted visibility applications. More specifically, the present application relates to a system and method for providing safe, durable visual assistance and video and/or audio recording capability for hazardous, low or restricted visibility environments.

BACKGROUND

The underground mining environment by its very nature may be limiting in terms of visibility. Operators of mobile underground equipment may be at a disadvantage due to the area in which they have to operate their machine. Lighting technology advancements have greatly improved the environment, but low visibility and blind spots may still exist. Safe and durable recording systems providing real time and recorded video need to be used in underground mining and other hazardous, low or restricted visibility environments (such as oil and gas, chemical, or any other equipment operated in a Class 1, 2 or 3 Div 1 or 2 environment as defined in the current version of the National Electrical Code) to help equipment operators have a larger field of view.

Video cameras incorporated in such recording systems may serve as "mirrors" for the vehicles on which they are equipped to allow the operator to see areas that normally are blind to the operator. In an environment where man and machine co-exist, there is a great danger of workers being struck or even run over by the mobile equipment. Although Proximity Detection may be implemented to prevent these accidents, an individual may not have a "tag" on them so as to be detected by a Proximity Detection system. As a result, the individual's presence may not de-energize the equipment with which they come into contact. Furthermore, such detection techniques provide only one layer of protection. To ensure proper underground work place safety, multiple layers of protection should be employed.

Thus, there is a need to provide additional layers of protection to avoid these types of accidents. The human operator element may be the primary layer of protection. Additional layers of protection may be provided through better lighting and the implementation of video recording systems to provide the operator with greater visibility around the machine while it is in operation. Further, with an appropriate and durable DVR or other video and/or audio recording system capturing the machine operation, the machine operator becomes more accountable for ensuring that the machine is always operated in a safe manner. Such a system may also aid investigators in the event that an accident or equipment issue should occur.

The present application appreciates that visibility, safety, and accountability in an underground mining environment may be a challenging endeavor.

SUMMARY

According to one aspect of the disclosure, embodiments of a safe, durable real time observation system for hazardous, low or restricted visibility environments are provided.

According to an aspect of the disclosed subject matter, embodiments of a method for implementing a safe, durable real time observation system for hazardous, low or restricted visibility environments are provided.

According to another aspect of the disclosed subject matter, embodiments of a safe, durable recording system for hazardous, low or restricted visibility environments are provided.

According to yet another aspect of the disclosed subject matter, embodiments of a method for implementing a safe, durable recording system for hazardous, low or restricted visibility environments are provided.

BRIEF DESCRIPTION OF THE DRAWINGS

The accompanying figures, which are incorporated in and constitute a part of the specification, illustrate various example systems and methods, and are used merely to illustrate various example embodiments. It should be noted that various components depicted in the figures may not be drawn to scale, and that the various assemblies and designs depicted in the figures are presented for purposes of illustration only, and should not be considered in any way as limiting.

DETAILED DESCRIPTION

Figure 1:
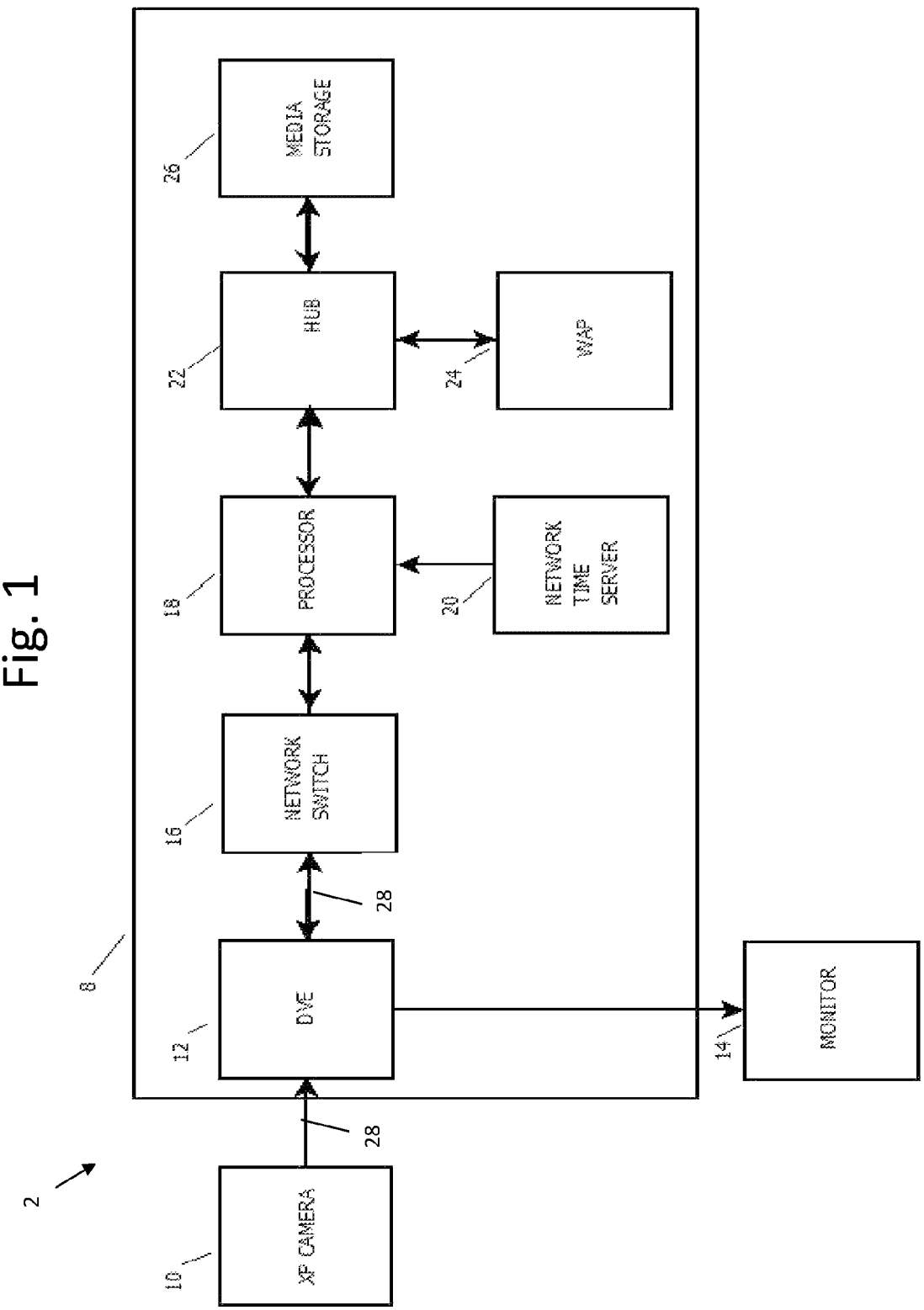
FIG. 1 is a block diagram of one embodiment of an underground recording system in accordance with the disclosed subject matter.

FIG. 1 illustrates an embodiment of an underground recording system 2 in accordance with the principles of the disclosed subject matter. Underground recording system 2 may include an explosion proof (XP) box 8, an explosion proof (XP) camera 10, a digital video encoder (DVE) 12, a monitor 14, a network switch 16, a processor 18, a network time server 20, a hub 22, a wireless access point (WAP) 24, a media storage 26, and a communication medium 28. In one embodiment, all of the components of underground recording system 2 may be encompassed within a single XP box 8. The single XP box 8 may be an MSHA-approved explosion proof housing that substantially prevents flame or ignition inside XP box 8 from the ignition of the hazardous atmosphere outside of XP box 8. XP box 8 may be, for example, PN 2010-34551-M, from Mining Controls, Inc., or other applicable housing as will be known to one of ordinary skill in the art. In other embodiments, one or more components of the underground recording system 2 may be contained within its own XP box 8. In the embodiment of FIG. 1, XP camera 10, and monitor 14 are located external to XP Box 8 and may be encompassed within their own XP Box 8 as warranted by their locations or as desired.

XP camera 10 may capture images and transmit images to DVE 12 via communication medium 28. Images may be captured and transmitted in any of a variety of formats, including for example analog video format, digital video format, or other format as will be known to one of ordinary skill in the art. In one embodiment, XP camera 10 is a PN 7015-34290-14 from Mining Controls, Inc. Other cameras may be likewise be used. While FIG. 1 shows a single XP camera 10, multiple XP cameras 10 may be included in underground recording system 2 depending upon coverage area, type of camera utilized, and any of a variety of other factors known to the ordinary artisan, or as desired. Moreover, audio may also be captured, recorded, and stored for later retrieval, the implementation of which will be known to those of ordinary skill in the art.

DVE 12 may receive video signals from XP camera 10 and may transmit video signals to monitor 14 for display over communication medium 28. DVE 12 may at least one of encode, decode, and convert received video signals and may transmit video signals to other components in underground recording system 2 for further processing or storage. In one embodiment, DVE 12 encodes received video signals into an MPEG file format. In another embodiment, DVE 12 encodes received video signals into other file formats as will be known to the ordinary artisan. Again, while FIG. 1 shows only a single DVE 12, multiple DVEs 12 may be included in underground recording system 2. In one embodiment, the DVE 12 has internal storage (e.g., a Micro SD slot for a Micro SD card) for storing the video signals thereby providing storage redundancy with the media storage 26.

In one embodiment, monitor 14 may be incorporated into underground recoding system 2 for receiving video signals from DVE 12 via communication medium 28 for display to an equipment operator. One or more monitors 14 may be employed locally or remotely and may receive video signals originating from one or more XP cameras 10. In one embodiment, monitor 14 may be a PN 7015-34551-13 from Mining Controls, Inc. Other monitors will be known to the ordinary artisan.

Network switch 16 may receive and transmit signals to various components in underground recording system 2 via communication medium 28. In one embodiment, network switch 16 may facilitate receiving and/or transmitting of signals between XP camera 10 and processor 18 and between network time server 20 and processor 18, over Ethernet cabling. In one embodiment, network switch 16 is a LTD HT-S1105DS from HTF Electronic Co. Other network switches will be known to the ordinary artisan.

Processor 18 may oversee processes necessary to at least one of view, manage, and store time stamped videos originating with XP cameras 10, or from other sources. In one embodiment, processor 18 at least one of: time stamps and saves video files in segments based on time, size or other criteria; monitors storage media, purging files when storage capacity reaches a particular threshold; operates a web server for user interface; runs an SMB Share (file share service) to allow users to manage and view stored files; manages wireless access point software (e.g., WIFI, WIMAX, XBEE); and interfaces a system hardware real time clock. In one embodiment, processor 18 is a Beagle-Bone Black from the BeagleBoard.org Foundation. Other processors may be used in underground recording system 2.

Network time server 20 may include a hardware real time clock that maintains clock time programmed by a user, which may be synced to each XP camera 10 in underground recording system 2 via processor 18. In one embodiment, each underground recording system 2 may have its own network time server 20. In another embodiment, a network time server 20 may serve multiple underground recording systems 2. Network time server 20 may be implemented using a Chronodot real time clock (RTC), from Macetech, LLC.

Hub 22 may transmit and receive signals among components of underground recording system 2. In one embodiment, hub 22 may be a Universal Serial Bus (USB) hub that transmits and receives signals among WAP 24, media storage 26, and processor 18. In one embodiment, hub 22 may be implemented using a RPI-HUB-MODULE, from Future Technology Devices International, Ltd. Other hubs will be known to the ordinary artisan.

WAP 24 may allow wireless devices (such as personal computers, laptops, tablets, other smart devices, and the like) to connect to underground recording system 2 using at least one of Wi-Fi, other 802.11 applicable standards, or similar wireless communication. In one embodiment, WAP 24 may connect to a router. In another embodiment, WAP 24 may be integrated with a router. WAP 24 may be implemented in one embodiment by a EDIMAX wireless access point from EDIMAX Technology Co., Ltd.

Media storage 26 may store video files received from processor 18 for possible retrieval. Media storage 26 may be implemented by one or more hard drives or other applicable electronic storage devices (such as flash memory devices, including but not limited to USB, SSD, SD, microSD, Compact flash products, SATA, IDE, optical media such as CD, DVD, and Blu-Ray, and other like devices). In one embodiment, media storage 26 is implemented using a SSD from MyDigitalSSD.

Communication medium 28 may provide signal transmission between various components of underground recording system 2 and may be wired or wireless, a combination thereof, component driven (i.e., as needed for a particular component), environment driven, or as otherwise dictated by desire or need. In one embodiment, communication medium 28 may incorporate Ethernet cabling or 8163 Multi-Conductor Low Capacitance Computer Cable from Belden Inc. Underground recording system 2 may incorporate a power supply (not shown) to power various components.

In one embodiment, power supply may provide 12 V DC and 5 V DC to components of underground recording system 2. Various ways of implementing the power supply will be known to those of ordinary skill in the art.

While the functionality of the underground recording system 2 has been described in components, functionality of the components is not intended to be limited to a particular physical implementation. Functionality of one or more components may be combined into a single component or distributed to other components. For example, functionality may be distributed such that video signals are transmitted directly to monitor 14 from XP camera 10 without passing through a physical DVE 12 component. Moreover, underground recording system 2 need not be limited to attachment to mobile equipment (such as continuous miners, shuttle cars, bolters and other portable and mobile equipment) but may be mounted in fixed locations (such as shops, pumps, or other equipment fixed at a particular location) or carried by personnel. Furthermore, the functionality of underground recording system 2 may find application in other hazardous environments with low or restricted visibility environments (such as oil and gas, chemical, or any other equipment operated in a Class 1, 2 or 3 Div 1 or 2 environment) in addition to underground mining.

Figure 2:
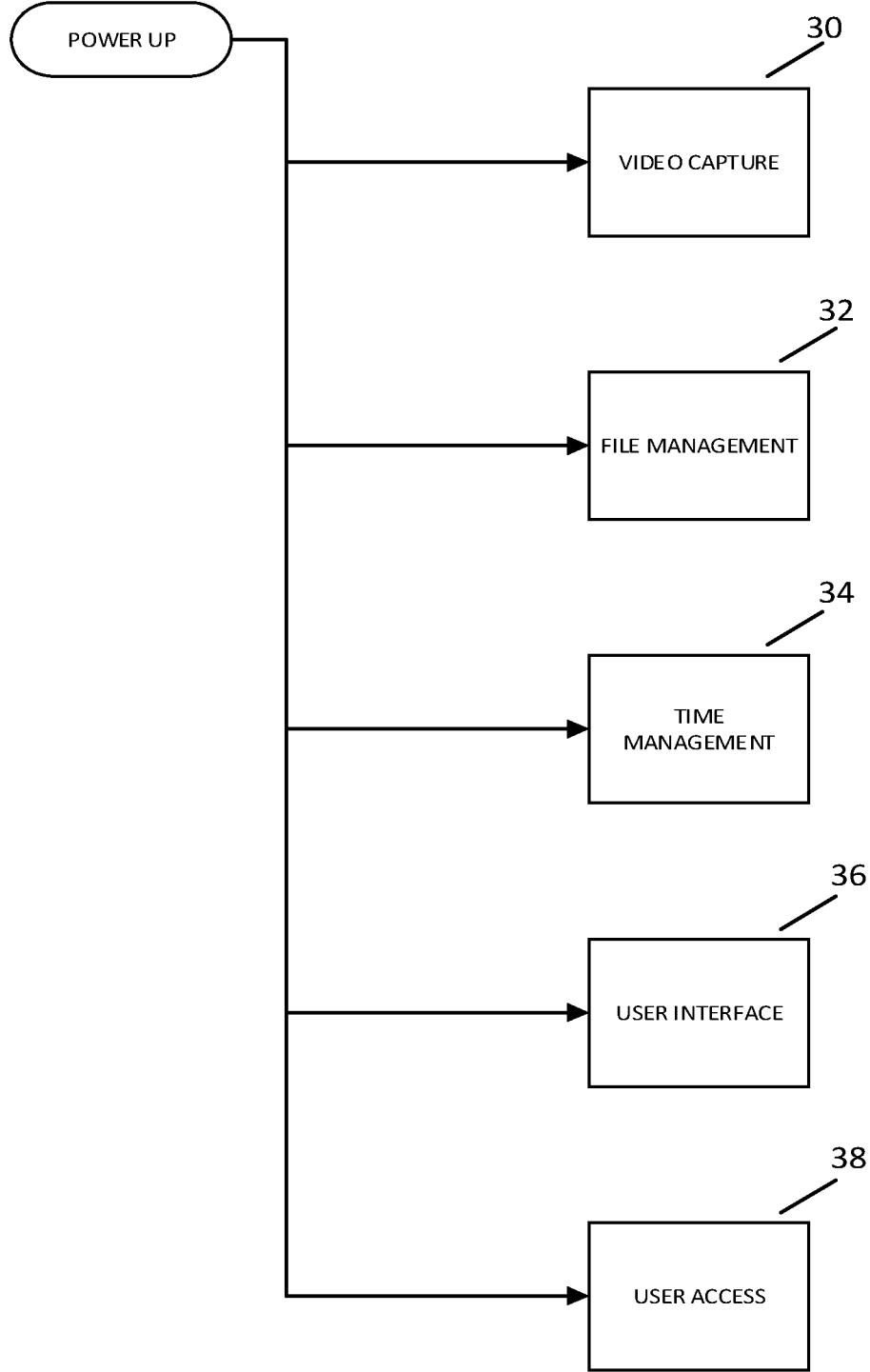
FIG. 2 is a flowchart depicting an embodiment of an algorithm implemented in an underground recording system in accordance with the disclosed subject matter.

FIG. 2 is a flow chart illustrating example processes that may be implemented by underground recording system 2 upon power up for one embodiment. A process 30 may pertain to video capture. In one embodiment, video may be captured from a RTSP (Real Time Streaming Protocol) stream from DVE 12 and implemented using video capture software comparable to open source automatic video conversion software AVConv.

A process 32 may pertain to file management of files located on media storage 26. Process 12 may monitor an amount of used space on media storage 26 and may remove files once space used reaches a particular threshold of storage capacity. In one embodiment, a first-in-first-out (FIFO) algorithm may be used to remove the oldest files when storage space used reaches about ninety percent (90%) capacity. Other criteria for file removal such as file size or file origin (i.e., from which camera) may be implemented.

A time management process 34 may be responsible for synchronizing time stamps for video files obtained from images received from various XP cameras 10 in one or more underground recording systems 2. Time management process 34 may be implemented using a Network Time Protocol (NTP) server. Time management process 34 may provide input to DVE 12 which synchronizes timestamps for video received from XP cameras 10.

A user interface process 36 may manage and interact with a user interface to allow an operator or other user to view live and previously recorded video and may include or interface with a web server and network file server among other system components. In one embodiment, user interface process 36 may be implemented by open source lighttpd, or comparable web server alternatives.

A user access process 38 may allow wireless access to a web interface and network file share and may be implemented using wireless access point software comparable to open source Samba.

Figure 3:
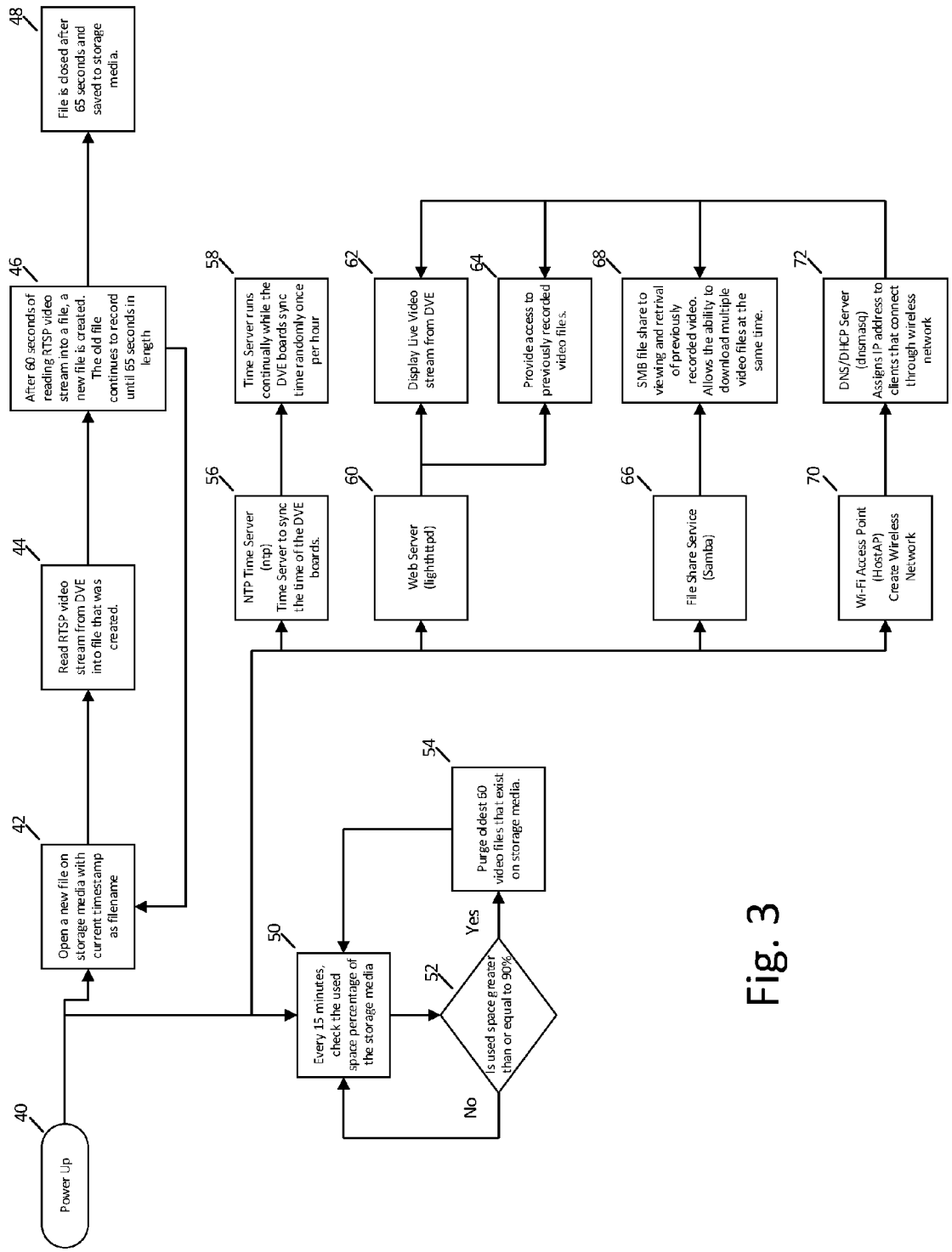
FIG. 3 is a flowchart depicting an embodiment of an algorithm implemented in an underground recording system in accordance with the disclosed subject matter.

FIG. 3 is a flowchart illustrating an algorithm implemented for one embodiment of underground recording system 2. Power may be applied to underground recording system 2 and a boot process may start at step 40. During a boot process, network time server process at step 56, web server process at step 60, file share service process at step 66, and WAP process at step 70 may start and may continue to run as long as power is applied to underground recording system 2.

Network time server 20 may be initialized to allow client devices to sync their times to a common reference at step 56, and network time server 20 may begin to supply timing information at step 58. In one embodiment, DVEs 12 may sync their internal clocks to network time server 20 once per hour.

Web server lighthttpd may be initialized at step 60. Web server lighthttpd may be responsible for serving up a web interface to underground recording system 2 at step 60. Once step 60 has completed, interface pages required for displaying live video at step 62 and for displaying recorded video at step 64 may be served. Web server lighthttpd may allow an end user to view live video coming into underground recording system 2 at step 62. Web server lighthttpd may allow an end user to list and to view previously recorded video files directly from a web interface at step 64.

A network file service may be initiated at step 66. A network file service may be responsible for creating SMB file share at step 68, which may allow an end user to at least one of view and download multiple recorded video files at a time.

WAP 24 may be initialized to allow wireless (e.g., Wi-Fi or related standards) access to a web interface and network file share of underground recording system 2 at step 70. Once an end user connects to WAP 24, an end user may be given an IP (Internet Protocol) address assigned by a DHCP (Dynamic Host Configuration Protocol) Server at step 72 and may be connected wirelessly to underground recording system 2 and is able to launch a web interface to view video or access a file share to download previously recorded video files.

Returning to step 40, for one embodiment, once a boot process is completed, underground recording system 2 may wait until the next full minute to begin recording. At that time, processor 18 may open a file on media storage 26 with a current system timestamp at step 42.

After a file is opened on media storage 26 with a current timestamp, processor 18 may begin to read a RTSP stream from DVE 12 into the file at step 44.

For one embodiment, 60 seconds into the previous recording, processor 18 may create and open a new file on media storage 26, with a current system timestamp, and begin to read the RTSP stream into the new file at step 46. A previous file may continue to record up to 65 seconds in length. This overlap in recording may prevent any lost video from occurring during a file change. Other methods of preventing data loss will be known to those of ordinary skill in the art.

In one embodiment, once a file reaches 65 seconds in length, processor 18 may close a file in media storage 26 to preserve it for later review at step 48.

For one embodiment, steps 42, 44, 46, and 48 (i.e, The process of (1) opening a file, recording a video stream for 65 seconds, (3) opening a new file, and recording the video stream 60 seconds into the recording of the previous file to prevent video loss, and (4) storing the completed file to the media storage 26) may continue as long as power is applied to underground recording system 2.

A check may be made by processor 18 at predetermined intervals (e.g., every 15 minutes) to determine if a threshold level of storage has been used at step 50.

A decision as to whether storage capacity threshold (e.g., 90% storage capacity) has been reached may be made at step 52. If this threshold capacity has not been met, process may return to step 50 for an additional period of time (e.g., 15 minutes). If a storage capacity threshold has been exceeded, process proceeds to step 54.

Processor 18 may check creation date and timestamp of every video file located on media storage 26 at step 54. Based on predetermined criteria (e.g., oldest 60 files), files may then be purged from media storage 26 to keep a storage threshold under, for example, about 90%. After purging files, process may return to step 50 to wait for another predetermined period of time to check a storage threshold again.

While certain embodiments of the invention are described above, it should be understood that the invention can be embodied and configured in many different ways without departing from the spirit and scope of the invention. For example, in one embodiment, at least two of hub 22, network time clock 20, network switch 16 may be made into one single component. Also, underground recording system 2 may be enclosed in one or many explosion proof enclosures. Further, processor 18 may also monitor and stamp videos with machine telemetry, and atmospheric conditions or other pertinent information. Processor 18 may also prohibit machine operation if underground recording system 2 is not operating, for example, by taking away a run permissive status bit in a control scheme, or disabling a control power relay. Audio may be incorporated with video. Moreover, cameras may include pan, tilt, zoom, and other functionality controlled by DVE 12, which may be further controlled by processor 18. Additionally, underground recording systems 2 need not be attached to mobile equipment (such as continuous miners, shuttle cars, bolters and other portable and mobile equipment) but may be mounted in fixed locations (such as shops, pumps, or other equipment fixed at a particular location) or carried by personnel.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, A Dictionary of Modern Legal Usage 624 (2d. Ed. 1995). Also, to the extent that the terms "in" or "into" are used in the specification or the claims, it is intended to additionally mean "on" or "onto." To the extent that the term "substantially" is used in the specification or the claims, it is intended to take into consideration the degree of precision available or prudent in manufacturing. To the extent that the term "selectively" is used in the specification or the claims, it is intended to refer to a condition of a component wherein a user of the apparatus may activate or deactivate the feature or function of the component as is necessary or desired in use of the apparatus. To the extent that the term "operatively connected" is used in the specification or the claims, it is intended to mean that the identified components are connected in a way to perform a designated function. As used in the specification and the claims, the singular forms "a," "an," and "the" include the plural. Finally, where the term "about" is used in conjunction with a number, it is intended to include ±10% of the number. In other words, "about 10" may mean from 9 to 11. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

As stated above, while the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art, having the benefit of the present application. Therefore, the application, in its broader aspects, is not limited to the specific details, illustrative examples shown, or any apparatus referred to. Departures may be made from such details, examples, and apparatuses without departing from the spirit or scope of the general inventive concept.

What is claimed is:

1. A hazardous environment video recording system comprising:
   at least one cameras for capturing images of the environment and for transmitting the images as video signals over at least one communication medium;
   at least one digital video encoder operably connected to the at least one camera via the at least one communication medium for receiving video signals from the camera;
   at least one monitor operably connected to the at least one camera via the at least one communication medium for displaying the captured images;
   at least one processor operably connected through at least one network switch and the at least one communication medium to the one or more digital video encoders;
   at least one network time server operably connected through the at least one communication medium to the at least one processor;
   a hub operably connected to the at least one processor, to at least one wireless access point for providing wireless access, and to at least one media storage device for storing the captured images in the video signal for later retrieval.

2. The system of claim 1 wherein the hazardous environment is an underground mining environment.

3. The system of claim 1 wherein the hazardous environment is one of a Class 1 Div 1 environment, Class 1 Div 2 environment, Class 2 Div 1 environment, Class 2 Div 2 environment, Class 3 Div 1 environment and Class 3 Div 2 environment.

4. The system of claim 1 wherein the system is located on at least one of mobile equipment, fixed equipment, and personnel.

5. The system of claim 1 wherein the camera is enclosed in a first explosion proof enclosure; the digital video encoder, network switch, processor board, network time server, hub, wireless access point, and media storage are enclosed in a second explosion proof housing; and the monitor is enclosed in a third explosion proof housing; and wherein the first, second, and third explosion proof housings are MSHA-approved explosion proof enclosures.

6. The system of claim 1 wherein the at least one digital video encoder has internal storage for storing the video signal.

7. The system of claim 6 wherein the internal storage comprises at least one removable media storage device.

8. The system of claim 1 wherein the at least one communication medium is at least one of wired, wireless, a combination thereof, component driven or environment driven.

9. The system of claim 1 wherein the processor oversee processes necessary to at least one of view, manage, and store time stamped videos originating with the at least one camera.

10. The system of claim 9 wherein the at least one processor time stamps and saves video files in segments based on time to the at least one media storage device; monitors the at least one media storage device and purges files when storage capacity reaches a particular threshold; operates a web server for user interface; runs file share service to allow users to manage and view stored files; manages wireless access point software; and interfaces a system hardware real time clock of the network time server.

11. A method for capturing and storing video files in a hazardous environment comprising:
   capturing an analog video signal from one or more cameras;
   transmitting the captured analog video signal to one or more digital video encoders;
   transmitting the analog video signal from the one or more digital video encoders to one or more monitors for viewing;
   changing the analog video signal to a digital file format at the one or more digital video encoders
   changing the analog video signal to a digital video signal at the one or more digital video encoders;
   transmitting the digital video signal to an Ethernet network switch;

receiving the digital video signal at the Ethernet network switch;

transmitting the digital video signal from the Ethernet network switch to a processor board;

receiving the digital video signal at the processor board;

converting the digital video signal to a digital video file;

transmitting the digital video file to a Universal Serial Bus hub;

receiving the digital video file at the Universal Serial Bus hub;

transmitting the digital video file from the Universal Serial Bus hub to a media storage device;

storing the digital video file in the media storage device;

transmitting a time/date stamp from a network time server to the one or more cameras;

operatively connecting the Universal Serial Bus hub to a wireless access point to transmit to and receive communication signals from wireless devices;

wherein the hazardous environment is one of a Class 1 Div 1 environment, Class 1 Div 2 environment, Class 2 Div 1 environment, Class 2 Div 2 environment, Class 3 Div 1 environment, Class 3 Div 2 environment, and an underground mining environment.

12. The method of claim 11 further comprising saving the digital video signal generated by the digital video encoder to a further media storage device for redundancy.

13. The method of claim 11 further comprising checking the used media storage space for a maximum fill of greater than or equal to predetermined percent fill and deleting the oldest predetermined segment of video files stored on the media storage device if the fill is greater than or equal to predetermined percent fill, wherein the checking is performed by the processor board.

14. The method of claim 11 wherein the transmitting of a time/date stamp synchronizes the digital video encoders with the Network Time Server on a predetermined interval.

15. The method of claim 11 wherein the operatively connecting to the wireless access point provides wireless access to the processor board, the media storage devices and the one or more digital video encoders.

16. The method of claim 11 further comprising running a file share service for viewing and retrieval of stored video files by the processor board and running web server software to view live and stored video by the processor board.

17. The method of claim 11 wherein storing the video data comprises opening a new file on the media storage with current time stamp as a file name, reading the video signal from the one or more digital video encoders into the opened file;

creating another file with current time stamp as name after a predetermined time;

closing the first file after predetermined time;

saving the closed file to the media storage continuously repeating this process;

and running a web page interface to view and transfer video files by the one or more digital video encoders.

18. An explosion proof underground mining digital video recorder system comprising:

one or more cameras connected to one or more digital video encoders;

one or more monitors connected to the one or more digital video encoders;

one or more Ethernet network switches connected to the one or more digital video encoders;

one or more processor boards connected to the one or more Ethernet switches;

the one or more processor boards connected to a network time server;

the one or more processor boards connected to a Universal Serial Bus hub;

the Universal Serial Bus hub further connected to a wireless access point; and the Universal Serial Bus hub further connected to a media storage device.

19. The system of claim 18 wherein the digital video encoder, Ethernet switch, processor board, Network Time Server, Universal Serial Bus hub, wireless access point, camera, monitor, and media storage are enclosed in one or more explosion proof enclosures.

20. The system of claim 18 wherein the digital video encoder is capable of supporting redundant storage via a removable media storage device.

* * * * *